United States Patent [19]

Zubatova et al.

[11] Patent Number: 4,956,056

[45] Date of Patent: Sep. 11, 1990

[54] METHOD OF ABRASIVE ELECTROEROSION GRINDING

[76] Inventors: Lidia S. Zubatova, Ljublinskaya, 111, kv. 120; Eduard Y. Grodzinsky, ulitsa Maril Ulyanovoi, 11, kv. 117; Ivan V. Shelyagin, Volgo-gradsky prospekt, 147/5, Korpus 1, kv. 60; Alexandr A. Zaitsev, Ulitsa Rogozhsky val, 7/1, kv. 108, all of, Moscow, U.S.S.R.

[21] Appl. No.: 326,882

[22] Filed: Mar. 20, 1989

[51] Int. Cl.$^5$ .................. B23H 5/04; B23H 5/08; B23H 7/12
[52] U.S. Cl. .................. 204/129.43; 204/129.46; 204/DIG. 9; 204/129.75; 219/69.17; 219/69.18
[58] Field of Search .................. 204/129.43, 129.46, 204/241, DIG. 009, 129.75; 219/69.17, 69.18

[56] References Cited

U.S. PATENT DOCUMENTS

| 4,236,985 | 12/1980 | Grodzinsky et al. | 204/129.46 X |
| 4,448,656 | 5/1984 | Kuromatsu | 294/129.46 X |
| 4,641,007 | 2/1987 | Lach | 204/129.46 X |
| 4,849,599 | 7/1989 | Kuromatsu | 204/129.46 X |

FOREIGN PATENT DOCUMENTS 841889 6/1981 U.S.S.R. .

Primary Examiner—Donald R. Valentine
Attorney, Agent, or Firm—Burgess, Ryan & Wayne

[57] ABSTRACT

A method of grinding includes the application to an abrasive wheel in a grinding zone of a pulse voltage, arranged out of the grinding zone is an electrode to which is applied a rectified voltage having an amplitude and a ripple factor ensuring formation of an oxide film on a surface of the wheel, and use is made of a coolant having a conductivity from $2 \cdot 10^{-3}$ to $2 \cdot 10^{-2}$ ohm$^{-1}$ cm$^{-1}$.

4 Claims, 1 Drawing Sheet

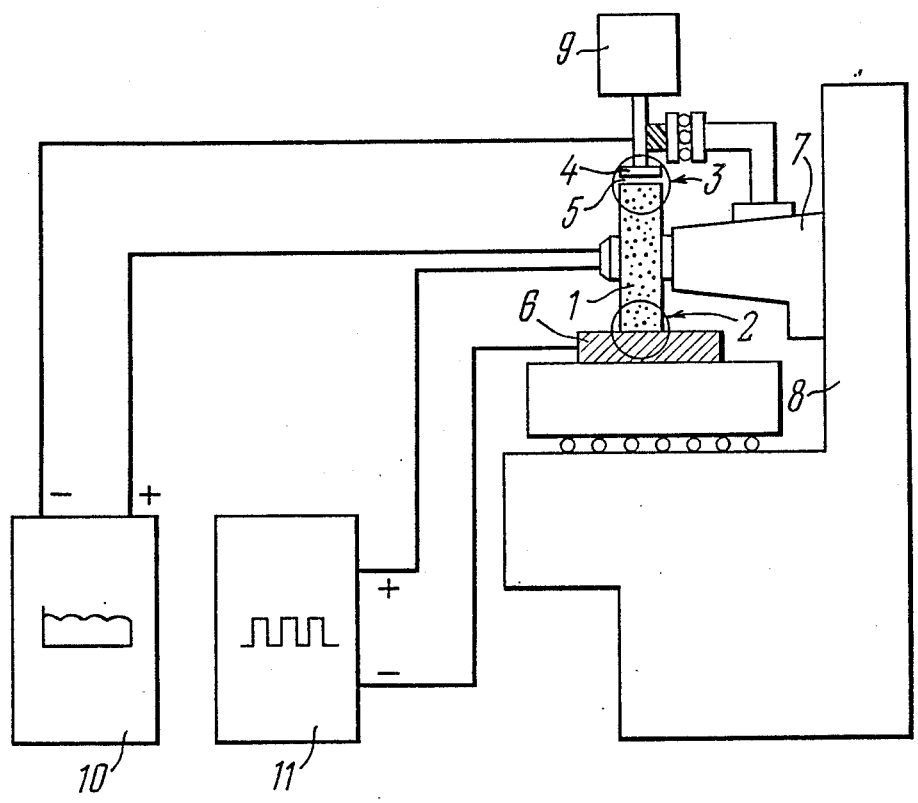

METHOD OF ABRASIVE ELECTROEROSION GRINDING

TECHNICAL FIELD

The present invention relates to the field of grinding, and more particularly to a method of abrasive electroerosion grinding.

Most advantageously the present invention may be used in surface, cylindrical and internal grinding of difficult-to-work materials (hard, brittle or tough), for example hard-magnetic alloys, stainless and high-temperature steels, aluminium and its alloys, copper and its alloys, as well as for sharpening of cutting tools from hard and high-speed steels of any grades.

Besides, the invention may be used for grinding articles made of ordinary structural steels and cast iron in the cases where it is necessary to reduce forces applied to and temperatures arising on the surface being ground.

BACKGROUND OF THE INVENTION

The development of leading industries is accompanied by a continuous increase in the range and scope of manufactured materials featuring high service properties (for example, heat-resisting, extrahard materials, materials having desired electronic or electrotechnical characteristics, etc.) but poor machinability. At the same time the requirements to the quality of machining of such materials are ever growing, the main requirements being the following: absence of defects, for example chipping, microcracks, burns in the surface layer of articles, and a low suerface roughness.

Besides, there exist such general requirements as a high productive capacity and a reasonable wear of grinding tools from the view point of technology and economy. To satisfy all these requirements using the traditional methods of abrasive grinding is not possible in most of the cases. Thus, for grinding such difficult-to-work materials use is frequently made of a method of diamond-electrochemical grinding which combines processes of microcutting and electrochemical removal of workpiece metal. However, this method has a number of disadvantages limiting and hindering its use.

The main of such disadvantages are use of electrolyte solutions as working media owing to which the most vital units of machines have to be manufactured from corrosion-resisting materials; large dimensions, high cost and complicated maintenance of the diamond-electrochemical grinding machines; a high power consumption of the method, large operating currents (up to several thousands of amperes).

There is known in the art a method of abrasive electroerosion grinding of difficult-to-work materials (SU, A, No. 841,889) using a metallic-bond wheel and a coolant, whereby a pulse voltage is applied to the wheel in a zone of grinding of a workpiece and an electrode is arranged out of that zone to produce an additional electric action upon the wheel. The use of noncorrosive coolants as working media for carrying out this method makes it possible to employ the existing grinding materials, and, in the newly developed machines, to use ordinary structural materials. Moreover, the method according to SU, A, No. 841,889 compared with the diamond-electrochemical method has the following advantages: a ten-fold factor of time reduction in working current (not above 50 A): a 15-20% decrease in power consumption; dimensions of the auxiliary equipment (tanks, cleaning systems, power supply sources) reduced by a factor of 2-4.

However, when carrying out this prior art method of abrasive-electroerosion grinding the wear of the abrasive tool remains considerable (from 5 to 30 mg/g) which results in great consumption of the wheels and requires frequent replacement thereof; the machining is accompanied with comparatively strong sparking, luminous radiation and noise; in a number of cases (for example in highly productive rough grinding) the cutting properties of the abrasive tool cannot be stabilized with the aid of electric action.

The main cause of such disadvantages is conductance (though inconsiderable) of the working media used, which results in a reduction of the dielectric strength of the interelectrode space. This drawback brings about a reduced voltage at the power source output, losses of energy into the surrounding conducting medium, unsatisfactory localization of discharges on the surface of the electrodes. To make up for these losses, it is necessary to increase a pulse voltage amplitude and power of the power source which results in an increase in noise, luminous radiation and in wear of the wheels. Using organic liquids (kerosene, oil, etc.) as a working medium which is in common practice with the electroerosion machines is inadmissible in the case of the grinding machines because of the risk of ignition of the liquid atomized by the wheel rotating at a speed of 15-30 m/s.

SUMMARY OF THE IVNENTION

The principle object of the invention is to provide a method of abrasive electroerosion grinding using a metallic-bond abrasive wheel and a coolant which would make it possible to reduce wear of an abrasive tool thereby prolonging its service life and to increase accuracy of machining, to decrease loss of time for replacing the tool and to create favourable conditions for automating the process and ensuring its continuity.

Another object of the invention is to provide a method of abrasive electroerosion grinding which would ensure stable cutting properties of an abrasive tool within the whole period of its service which guarantees stable parameters of manufactured articles, simplifies operation of the machines, excludes loss of time for periodical dressing of the tool.

Still another object of the invention is to provide such a method which would make it possible to improve the working conditions by reducing power of electric discharges in the grinding zone and, hence, the level of luminous radiation and noise, as well as power consumed by the process.

With the foregoing and other objects in view, the invention resides in a method of abrasive electroerosion grinding using a metallic-bond abrasive wheel and a coolant whereby a pulse voltage is applied to the wheel in a zone of grinding of a workpiece, whereas an electrode adapted to produce an additional electric effect upon the wheel is arranged out of the grinding zone, wherein, according to the invention, applied to the electrode is a rectified voltage having an amplitude and a ripple factor ensuring formation of an insulating oxide film on a surface of the wheel, and the coolant has a conductivity of from $2 \cdot 10^{-3}$ to $2 \cdot 10^{-2}$ ohm$^{-1}$ cm$^{-1}$.

The method according to the invention provides a reduction in the wear of the grinding wheel, stabilization of its cutting property throughout its whole service life ensures a high productive capacity in machining of parts of any difficult-to-work materials, and a decreased level of noise and luminous radiation in the process of grinding.

To obtain such effects, it is necessary to ensure formation of a stable oxide film on the grinding wheel working surface, featuring dielectric properties, which is achieved through application of a positive voltage to the wheel from a d.c. source. The wheel metallic bond comprising copper or aluminium acted upon by electric current flowing between the wheel and the electrode in a poorly conducting medium represented by the coolant is subjected to anodic dissolution followed of a process of passivation, i.e. oxidation resulting in the formation of a dielectric film. The amplitude and ripple factor of the rectified current are so selected as to prevent electric discharges in the interelectrode space, causing destruction of the oxide film, but on the other hand, to ensure a sufficient rate of formation of this film. This is also achieved by limiting the working medium conductivity to a certain degree. With the conductivity being less than $2 \cdot 10^{-3}$ ohm$^{-1}$ cm$^{-1}$ the appearing current is not sufficient to form an oxide film: with the conductivity exceeding $2 \cdot 10^{-2}$ ohm$^{-1}$ cm$^{-1}$ there appears the risk, on the one hand, of equipment corrosion, and, on the other hand, of a partial dissolution of the oxide film because of repassivation.

An increase in the total dielectric strength of the interelectrode space owing to the provision of the oxide film ensures a fuller use of energy of electric discharges for a useful process of electroerosion dressing of the wheel. This makes it possible to decrease the pulse voltage amplitude compared with the amplitude used in the prior art method of abrasive electroerosion grinding, which provides for a decrease in the energy consumed in the process, in the wheel wear, in the level of noise and luminous radiation.

It is due to the fact that in the method of the invention exposure of new abrasive grains instead of dulled ones takes place simultaneously due to electrochemical dissolution and electroerosion crushing of the bond, a high stability of cutting properties of the grinding wheel is maintained during the whole service period thereof. Moreover, the oxide film formed on the wheel reduces friction in the grinding zone which contributes to an additional decrease in energy consumed for machining and to a rise in the efficiency thereof.

An electroerosive effect on the grinding wheel provides for removal of the oxide film, in the first turn, at the most projecting sections of its relief, thereby speeding up the process of correcting the wheel geometry.

The process of oxidation of the wheel surface is performed in aqueous coolants having a conductivity of from $2 \cdot 10^{-3}$ to $2 \cdot 10^{-2}$ ohm$^{-1}$ cm$^{-1}$. The higher conductivity is not expedient because of worsening of commutation conditions of electric discharges owing to leakage currents (electrochemical current) and also because of corrosion of the machine units.

If the conductivity is less than $2 \cdot 10^{-3}$ ohm$^{-1}$ cm$^{-1}$, the rate of oxide film formation is insufficient for achieving the effects inherent in the method.

The amplitude of the rectified voltage is preferably set to be within the limits of from 5 to 35 V. This makes it possible to provide in all cases the desired rate of the oxide film formation depending on the type of the material being ground, required productivity and quality of the surface. The lower voltages (from 5 to 15 V) are preferably used in the grinding of easily passivated materials (aluminium, copper, tungsten, etc.), as well as in the case of inconsiderable grinding allowance to be removed from workpieces at a comparatively small productivity. If the voltage is below 5 V, the rate of film formation even for such cases is insufficient since the oxide film destroyed in the grinding zone cannot be restored in time. With the rectified voltage amplitudes exceeding 35 V the repassivation process, i.e. electrochemical dissolution of the oxide film, begins. Moreover, energy consumption for machining rises unreasonably and electric discharges rupturing the film continuity occur. As a result, with the rectified voltage amplitudes higher or lower than those specified in the invention the process of oxide film formation on the wheel surface is disturbed which causes increased wear and deteriorated cutting properties of the wheel.

The ripple factor of the rectified voltage is preferably set to be between 10 and 15%. On the one hand, this provides a sufficient rate of the oxide film formation at a given value of the voltage amplitude, and, on the other hand, makes it possible to use, in the method according to the invention, comparatively simple power supply sources without additional complicated smoothing systems providing a reduction in ripples. Deviation from the above values of the rectified voltages and parameters of the working medium results either in an increased wear of the grinding wheel (due to sparking or insufficient rate of the oxide film formation) or in a gradual decrease in its cutting property and, hence, in a poor quality of machining and a reduced productivity.

It is preferred to supply the electrode with the rectified voltage having an amplitude of about 32 V and a ripple factor of about 12%, and to use the coolant having a conductivity of about $5 \cdot 10^{-3}$ ohm$^{-1}$ cm$^{-1}$.

Such conditions make it possible to obtain rather good results in the efficiency of grinding, quality of articles and decreased wear of the tool for a wide range of materials being machined, types of workpieces and production operations, and at the same time allow wheels of different grades to be used.

BRIEF DESCRIPTION OF THE DRAWING

The drawing shows a schematic diagram of a machine for realizing the method according to the invention.

DESCRIPTION OF THE PREFERRED EMBODIMENT OF THE INVENTION

A method of abrasive electroerosion grinding according to the invention is based on the studies carried out by the inventors, the results of which have been checked under the conditions of production. It has been proved that a process of electroerosion cleaning of an abrasive wheel 1 from products of cutting (grinds), and exposure of new working grinds runs more effectively if a dielectric oxide film has been preliminarily formed on a surface of the wheel 1. Provision of such a film on the wheel 1 makes it possible to reduce the amplitude voltage of pulses to 20±V; to lower down the value of working pulse current to 2-4 A: to reduce the wear of the grinding wheel to 1-5 mg/g: to increase 1.3-1.6 times the rate of metal removal from a workpiece; to reduce the level of noise and luminous radiation in a grinding zone caused by electric discharges by a factor of 2-4.

To form an oxide film arranged on the grinding zone 2, a zone 3 of electrochemical (anodic) oxidation of a metallic bond of the wheel 1 is provided; a direct voltage is applied to the wheel 1 and an electrode 4, and a coolant is fed to an interelectrode space 5, which coolant comprises a poorly conducting aqueous solution of inorganic (for example, sodium nitrite) or organic (for example, triethanolamine) matter. Under the action of electrochemical processes taking place in the interelectrode space 5 an anodic dissolution of the bond starts to cause partial exposure of working grains. Since the bonds comprise either copper or aluminium, i.e. easily oxidizable metals, the bond dissolution process gradually ceases, and the working surface of the wheel 1 gets coated with an oxide film. A sharp decrease in the working current value (from tens to units of amperes) indicates that the anodic dissolution process and the film formation process have come to an end.

Electric discharges occurring in the grinding zone as a result of the pulse voltage applied to the wheel 1 and the workpiece 6 cause an electroerosion crushing of the bond, exposure of cutting grains and removal of stuck grinds from the surface of the wheel 1.

As the wheel 1 arrives into the grinding zone 2 with the oxide film formed on the working surface thereof, conditions are created for the most complete use of energy of discharge for electroerosive removal of the bond. This makes it possible to reduce the energy of discharges compared with that used in the electroerosion grinding without such film and consequently to decrease the wear of the wheel 1, energy consumed for machining, noise and sparking in the grinding zone 2. Depending on the type of material being ground, characteristics of the wheel, requirements to the quality and productivity of machining, the value of voltage pulses (either their frequency, or duration, or both simultaneously) is changed proceeding from two main requirements:

the cutting capacity of the wheel should be as high as possible and does not change in time;

the wear of the wheel should be as low as possible.

However, the electric discharges while crushing the bond also destroy the oxide film. Its restoration should take a rather short (several milliseconds) time when each section of the wheel stays in a zone of anodic oxidation. As the studies have shown the high rates of formation of the oxide films on the surface of the grinding wheels are obtained provided there are fulfilled specific conditions relating mainly to the parameters of direct voltage applied to the electrode and the wheel, as well as to the characteristics of the working fluid.

The composition and parameters of the coolant should facilitate a quick formation of the oxide film, its continuity and dielectric strength. It has been found that water-base coolants comprising anticorrosive and antifriction agents in the form of inorganic sodium salts, triethanolamine, etc., satisfy these requirements to the greatest degree. The foregoing coolants should have a conductivity in the limits from $2 \cdot 10^{-3}$ to $2 \cdot 10^{-2}$ ohm$^{-1}$ cm$^{-1}$. A higher conductivity of the medium is not expedient because of appearance of corrosion on the machine units and worsening of conditions of commutation of electric discharges in the grinding zone owing to an increase in leakage currents (currents of electrolysis).

The media having the conductivity less than $2 \cdot 10^{-3}$ ohm$^{-1}$ cm$^{-1}$ is also not recommended for use as the rate of formation of oxide films therein is insufficient. The studies have shown that in the range of conductivities specified in the invention use may be made of any aqueous coolants available.

The rectified voltage amplitude is set within a range of from 5 to 35 V. The voltage exceeding 35 V causes a process of repassivation, i.e. dissolution of the film, the power consumption of the process rises, and, moreover, electric discharges cause electroerosive crushing of the film. With the voltages below 5 V the film is formed only at separate sections of the wheel working surface which impairs all machining characteristics.

The direct voltage amplitude should be selected experimentally as for each material being machined, production process, type of the wheel, and depending on the requirements imposed on the article, there exists an individual optimum value of this parameter which provides a minimum wear of the wheel with its cutting capacity stabilized in time.

The selection of the value of voltage amplitude is still insufficient as with the equal amplitude average voltages (and, hence, average current) may be different and insufficient for a quick formation of the oxide film. It has been found that with ripples not exceeding 10–15% the oxide film can be restored completely while the wheel remains in the oxidation zone.

With the rectified voltage amplitude equal to 32 V, the voltage ripple factor equal to 12% and the working medium conductivity equalling $5 \cdot 10^{-3}$ ohm$^{-1}$ cm$^{-1}$ the grinding method of the invention is the most universal, i.e. makes it possible to have rather high technical-and-economic indices when machining a wide range of materials and workpieces in different production operations wherein grinding wheels of different types are employed.

For better understanding the invention will be further described with reference to an embodiment thereof illustrated with a schematic diagram.

Secured on a grinding wheelhead 7 is an electrode 4 electrically insulated from a machine frame 8 and connected with a system 9 to feed it towards the working surface of the wheel 1. A negative terminal of a direct voltage source 10 is connected to the electrode 4, a positive terminal is connected to the metallic-bond diamond wheel. A pulse voltage source 11 is connected with its negative terminal to a workpiece 6 and with its positive terminal to the wheel 1. A plate of any conducting material such as steel of brass is used as the electrode 4. In the embodiment described below there was used as a tool a diamond wheel of a cylindrical shape 250 mm in diameter and 20 mm high, having a grain size of 125/160 μm and a metallic bond comprising copper and as a coolant an aqueous solution of sodium nitrite (0.4%) and triethanolamine (0.8%) having a conductivity of $2.7 \cdot 10^{-3}$ ohm$^{-1}$ cm$^{-1}$. Subjected to a surface grinding was a workpiece having an area of 25 cm$^2$ and made of plates of hard alloy incorporating 92% of tungsten carbide and 8% of cobalt, and of steel with a 1:1 ratio of areas. Used as sources of power supply were a 1 kW pulse generator having a pulse repetition frequency of 50 Hz and a rated current of 15 A and a 1 kW three-phase full-wave rectifier with a rated current of 25 A.

Grinding conditions (1) mechanical
  number of double strokes of the table per minute: 72
  value of a vertical feed per each double stroke, mm/double stroke: 0.02
(2) electric
  amplitude of pulse voltage, V: 25
  amplitude of direct voltage, V: 23

To realize the method, the following operations are performed in succession:

the working fluid supply is turned on and the grinding wheel is started to rotate;

the electrode is caused to touch the wheel and is ground to obtain an equidistant wheel surface mark; the electrode is removed from the wheel and thus a required interelectrode space is provided;

the rectified voltage source is switched on to form an oxide film on the whole surface of the wheel;

the pulse voltage source is switched on and the process of grinding of the workpiece is carried out.

In the process of grinding of the workpiece consisting of a hard alloy and steel under the above-mentioned conditions the erosion current amounted to 2.3 A, the direct current was equal to 11 A; the productive capacity was equal to 800 mm$^3$/min; the grinding wheel wear amounted to 1.5 mg/g; consumption of power on the spindle drive was equal to 0.62 kW, energy consumed in the process was 49 J/mm$^3$; the power on the spindle drive indirectly characterizing the cutting property of the wheel did not change within 300 min of operation.

In the process of grinding of the same workpiece with using the prior art method of diamond electroerosion grinding the current amounted to 28 A; the productivity was 620 mm$^{32}$/min; the wheel wear was 4.8 mg/g and power consumed by the process amounted to 86 J/mm$^3$. The power on the spindle drive within 70 min of operation increased from 0.63 kW to 0.78 kW; after 120 min of continuous operation the grinding process was ceased and the wheel was dressed.

Thus, the use of the method according to the invention makes it possible to intensify the process of grinding of difficult-to-work materials, to reduce consumption of expensive diamond tools and tools of cubic boron nitride, to bring down the power consumption for machining, as well as to improve the sanitary and hygienic conditions of work.

The method according to the invention may find application in metal working factories where parts of hard, brittle or tough materials are being ground.

What is claimed is:

1. A method of abrasive electroerosion grinding with the aid of a metallic-bond abrasive wheel and a coolant having a conductivity of from $2 \cdot 10^{-3}$ to $2 \cdot 10^{-2}$ ohm$^{-1}$ cm$^{-1}$, comprising the steps of:

applying a pulse voltage to said wheel in a zone of grinding;

arranging an electrode adapted to produce an additional electric effect on said wheel out of said zone of grinding of said workpiece;

creating an interelectrode space betwen the electrode and wheel for a coolant to be supplied thereinto;

applying a rectified voltage having an amplitude and a ripple factor to said electrode and wheel, which ensures formation of an insulating oxide film on the surface of said wheel.

2. A method as claimed in claim 1 in which the rectified voltage supplied has an amplitude of from 5 to 35 V.

3. A method as claimed in claim 1 in which the rectified voltage supplied has a ripple factor of from 10 to 15%.

4. A method as claimed in claim 1 in which the rectified voltage supplied has an amplitude of about 32 V and a ripple factor of about 12%, and the coolant used has a conductivity of about $5 \cdot 10^{-3}$ ohm$^{-1}$ cm$^{-1}$.

* * * * *